US009819574B2

(12) United States Patent
Yang et al.

(10) Patent No.: US 9,819,574 B2
(45) Date of Patent: Nov. 14, 2017

(54) CONCERTED MULTI-DESTINATION FORWARDING IN A JOINT TRILL FABRIC AND VXLAN/IP FABRIC DATA CENTER

(71) Applicant: Cisco Technology, Inc., San Jose, CA (US)

(72) Inventors: Yibin Yang, San Jose, CA (US); Liqin Dong, San Jose, CA (US); Alex Tsai, Cupertino, CA (US); Rajagopalan Janakiraman, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 378 days.

(21) Appl. No.: 14/535,665

(22) Filed: Nov. 7, 2014

(65) Prior Publication Data

US 2016/0134513 A1    May 12, 2016

(51) Int. Cl.
*H04L 12/761* (2013.01)
*H04L 12/947* (2013.01)
*H04L 29/08* (2006.01)

(52) U.S. Cl.
CPC ............. *H04L 45/16* (2013.01); *H04L 49/25* (2013.01); *H04L 69/325* (2013.01)

(58) Field of Classification Search
CPC ........ H04L 45/16; H04L 49/25; H04L 69/325
See application file for complete search history.

(56) References Cited

U.S. PATENT DOCUMENTS

2011/0299528 A1\* 12/2011 Yu ....................... H04L 12/1886
370/390

OTHER PUBLICATIONS

Routing Bridges: Base protocol specification, by R. Pearlman, Jul. 2011.\*
Routing Bridges (RBridges): Base Protocol Specification, RFC 6325—Routing Bridges (RBridges): Base Protocol Specification, Internet Engineering Task Force (IETF) R. Perlman, Request for Comments: 6325 Intel Labs, Category: Standards Track D. Eastlake 3rd, ISSN: 2070-1721 Huawei, D. Dutt, S. Gai, Cisco Systems, A. Ghanwani, Brocade Jul. 2011, pp. 1-99.

(Continued)

*Primary Examiner* — Christopher Grey
*Assistant Examiner* — Pamit Kaur
(74) *Attorney, Agent, or Firm* — Merchant & Gould P.C.

(57) ABSTRACT

Coordinating gateways for multi-destination traffic across a TRILL fabric and a VXLAN/IP fabric with a plurality of TRILL IS-IS TLVs and a plurality of Layer 3 IS-IS TLVs is provided herein. The plurality of TRILL IS-IS TLVs and the plurality of Layer 3IS-IS TLVs effectuate: grafting an IP multicast share tree with a plurality of TRILL distribution trees at only one of a plurality of gateways in a network interworking a TRILL fabric and a VXLAN/IP fabric; ensuring that multicast traffic traversing from the plurality of TRILL distribution trees is not looped back to the TRILL fabric through the VXLAN/IP fabric; restoring connectivity among a plurality of VXLAN/IP fabric partitions through the TRILL fabric if the VXLAN/IP fabric is partitioned; and restoring connectivity among a plurality of TRILL fabric partitions through the VXLAN/IP fabric if the TRILL fabric is partitioned.

20 Claims, 8 Drawing Sheets

(56) References Cited

OTHER PUBLICATIONS

Coordinated Multicast Trees (CMT) for TRILL draft-ietf-trill-cmt-01.txt, TRILL Working Group Tissa Senevirathne, Internet Draft CISCO, Intended status: Standard Track Janardhanan Pathangi, Updates: 6325 DELL, Jon Hudson, Brocade, Nov. 8, 2012, pp. 1-14.
VXLAN: A Framework for Overlaying Virtualized Layer 2 Networks over Layer 3 Networks draft-mahalingam-dutt-dcops-vxlan-02.txt, draft-mahalingam-dutt-dcops-vxlan-02—Virtual eXtensible Local Area Network (VXLAN): A Framework for Overlaying Virtualized Layer 2 Networks over Layer . . . Network Working Group M. Mahalingam Internet Draft D. Dutt, Intended Status: Experimental K. Duda Expires: Feb. 2013 Arista, P. Agarwal, Broadcom L. Kreeger, Cisco, T. Sridhar, VMware, M. Bursell, Citrix, C. Wright, Red Hat, Aug. 22, 2012, pp. 1-20.

* cited by examiner

| | Figure 3 Case 1 | Figure 3 Case 2 | Figure 3 Case 3 |
|---|---|---|---|
| Gateways advertised in TRILL fabric partition P1 via the new TRILL IS-IS Gateway List TLV and the union of advertisements | GW1 advertises {GW1, GW2} Union = {GW1, GW2} | GW1 advertises {GW1} GW2 advertises {GW2} Union = {GW1, GW2} | GW1 advertises {GW1, GW2} GW2 advertises {GW2, GW3} Union = {GW1, GW2, GW3, GW4} |
| Gateways advertised in VXLAN/IP fabric partition P1 via the new layer 3 IS-IS Gateway List TLV and the union of advertisements | GW1 advertises {GW1} GW2 advertises {GW2} Union = {GW1, GW2} | GW1 advertises {GW1, GW2} Union = {GW1, GW2} | GW1 advertises {GW1, GW2} GW4 advertises {GW3, GW4} Union = {GW1, GW2, GW3, GW4} |
| Gateways observed in TRILL fabric partition P1 via existing TRILL IS-IS TLVs | {GW1} | {GW1, GW2} | {GW1, GW3} |
| Gateways observed in VXLAN/IP fabric partition P1 via existing layer 3 IS-IS TLVs | {GW1, GW2} | {GW1} | {GW4} |
| Condition 1a satisfied in VXLAN/IP fabric partition P1 | Yes | Yes | No |
| Condition 1b satisfied in VXLAN/IP fabric partition P1 | Yes | No | Yes |
| Condition 2a satisfied in TRILL fabric partition P1 | Yes | Yes | No |
| Condition 2b satisfied in TRILL fabric partition P1 | No | Yes | Yes |
| Conclusion | TRILL fabric is partitioned, repairable via VXLAN/IP fabric | VXLAN/IP fabric is partitioned, repairable via TRILL fabric | Not repairable |

CONCERTED MULTI-DESTINATION FORWARDING IN A JOINT TRILL FABRIC AND VXLAN/IP FABRIC DATA CENTER

TECHNICAL FIELD

The present disclosure relates generally to multi-destination data forwarding, specifically in a joint TRILL Fabric and VXLAN/IP Fabric data centers.

BACKGROUND

There are two major fabric solutions for the new generation of data centers: Transparent Interconnect of Lots of Links (TRILL) fabric and Virtual eXtensible Local Area Network (VXLAN)/IP fabric. Typically, a TRILL fabric or VXLAN/IP fabric is based on a two-tier fat tree, also called Clos network, where each spine TRILL switch ("RBridge") or router connects to each leaf RBridge or router and vice versa.

TRILL fabric is based on the Internet Engineering Task Force ("IETF") TRILL protocol specified in RFC 6325 and which is incorporated herein in its entirety. TRILL provides a new architecture of layer two control and forwarding that enjoys major benefits such as pair-wise optimal forwarding, loop mitigation, multipathing and being provisioning free. The TRILL base protocol supports an active-standby model, via appointed forwarders (AF), to facilitate loop free connectivity between TRILL and non-TRILL networks. An active-active model is proposed in Coordinated Multicast Trees ("CMT") for TRILL draft-ietf-trill-cmt-01, available at http://tools.ietf.org/html/draft-ietf-trill-cmt-01, which is incorporated herein in its entirety. The active-active model may allow edge RBridges to select disjoint distribution trees for receiving and sending multi-destination traffic.

VXLAN/IP fabric uses existing IP unicast and multicast protocols such as Intermediate System to Intermediate System ("IS-IS") and Protocol Independent Multicast ("PIM") for underlay network control and forwarding while employing a new protocol, VXLAN, as the overlay solution. VXLAN is a scheme of layer 2 overlay on top of layer 3, which encapsulates customer frames with a VXLAN header and uses User Datagram Protocol ("UDP")/IP for transportation. The VXLAN header contains a VXLAN segment ID/VXLAN network identifier (VNID), which is a 24-bit field to identify virtual networks for different tenants. VXLAN tunnel end point (VTEP) is a software or hardware component that performs actual VXLAN encapsulation and decapsulation. The IP address used by a VTEP as the source address for VXLAN encapsulation is called VTEP address. The VTEP address is be learned along with inner source MAC addresses by remote VTEPs. Multi-destination frames in VXLAN are carried in underlying IP multicast packets which use group addresses as destination IP addresses. More details on VXLAN implementations may be found in VXLAN: A Framework for Overlaying Virtualized Layer 2 Networks over Layer 3 Networks, draft-mahalingam-dutt-dcops-vxlan-02, available at tools.ietf.org/html/draft-mahalingam-dutt-dcops-vxlan-02 which is incorporated herein in its entirety.

Two prior approaches for interworking between TRILL fabric and VXLAN/IP fabric have significant limitations. In a first approach, TRILL hello protocol over VXLAN overlay networks may be employed. For example, in FIG. 1, GW115, GW116 and GW117 may exchange TRILL hello Protocol Data Units ("PDUs"), which may be encapsulated in VXLAN with group addresses as destination IP addresses.

This first approach has at least three limitations. First, as load balancing must be done on the VLAN or segment/VNID basis, per flow load balancing is not possible, even for unicast traffic. Second, in order to receive TRILL hello PDUs, gateways need to join all VXLAN group addresses. A gateway may need to drop frames of those VLANs or segments/VNIDs for which it does not serve as appointed forwarder. This results in wasted bandwidth. Finally, if the TRILL hello protocol runs per segment/VNID, the control plane load may become too heavy.

In a second prior approach Virtual port channels ("vPC") may be employed. For example, in FIG. 1, if GW117 is absent, RTR122 may use a port channel to connect with GW115 and GW116, which may serve as vPC peers.

This second approach also has at least three limitations. First, vPC supports only two peer devices. It will not scale if more than two gateways are needed to handle a large amount of data traffic between TRILL fabric and VXLAN/IP fabric. Second, vPC requires dedicated peer links, which may be either underutilized or overloaded. Finally, vPC is a CISCO proprietary solution, which may not be able to interoperate with third party gateways.

Given the limitations of the above two approaches, embodiments of the present disclosure are designed to provide a standard based solution which can take advantage of the unique characteristic of VXLAN overlay networks, specifically that VXLAN builds on top of a layer three network instead of physical wires.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Methods and systems described herein may be implemented to coordinate gateways for multi-destination traffic across a TRILL fabric and a VXLAN/IP fabric with a plurality of TRILL IS-IS TLVs and a plurality of Layer 3 IS-IS TLVs, wherein the plurality of TRILL IS-IS TLVs and the plurality of Layer 3 IS-IS TLVs effectuate: grafting an IP multicast share tree with a plurality of TRILL distribution trees at only one of a plurality of gateways in a network interworking a TRILL fabric and a VXLAN/IP fabric; ensuring that multicast traffic traversing from the plurality of TRILL distribution trees is not looped back to the TRILL fabric through the VXLAN/IP fabric; restoring connectivity among a plurality of VXLAN/IP fabric partitions through the TRILL fabric if the VXLAN/IP fabric is partitioned; and restoring connectivity among a plurality of TRILL fabric partitions through the VXLAN/IP fabric if the TRILL fabric is partitioned.

For ease of discussion, the present specification focuses on Clos network topology and TRILL, with the understanding that the ideas to be presented may apply to arbitrary topologies and FabricPath implementations as well. Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Figure 1:
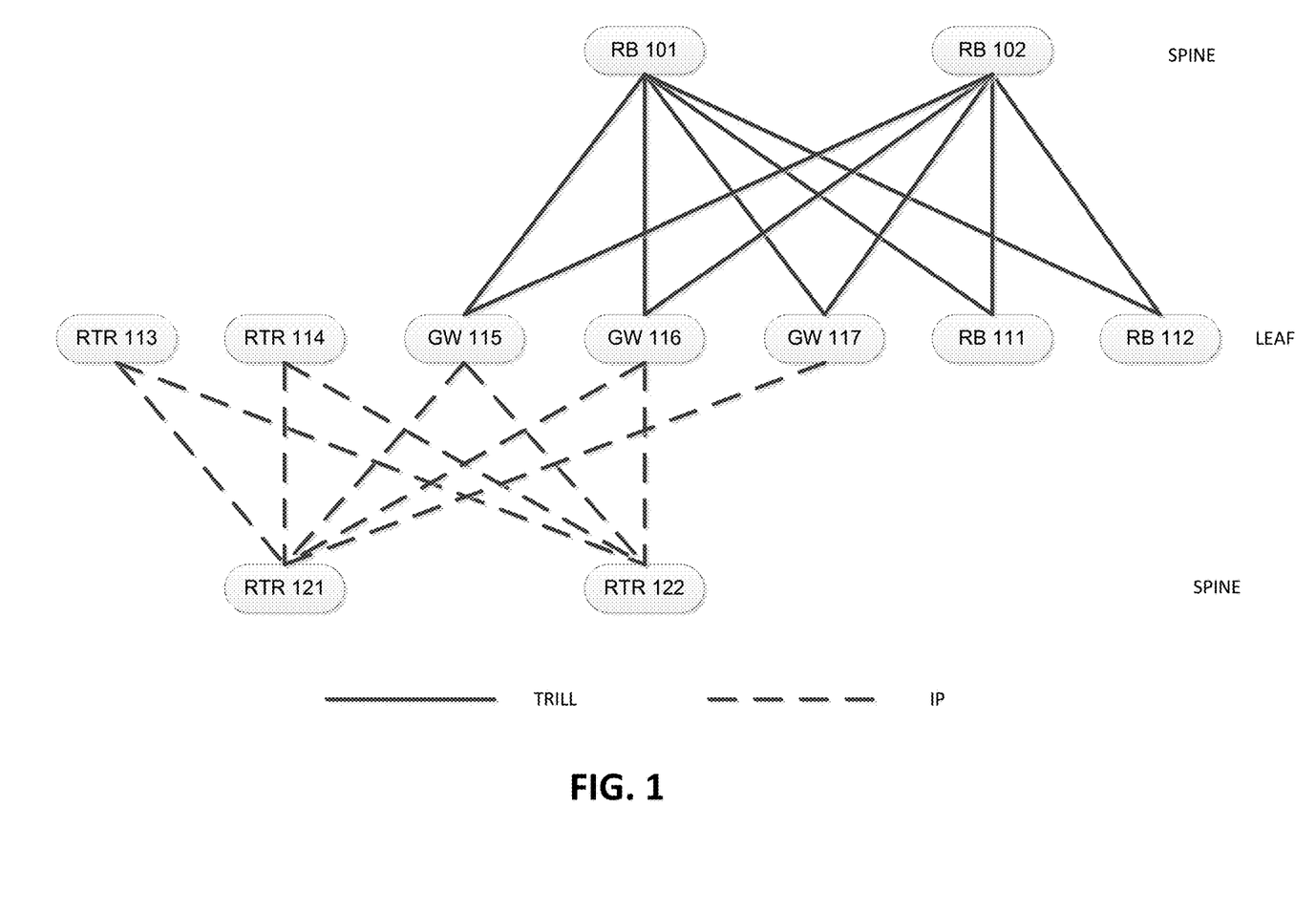
FIG. 1 depicts embodiments of a data center with both TRILL fabric and VXLAN/IP fabric in which embodiments of the present disclosure may be implemented.

FIG. 1 depicts embodiments of a data center with both TRILL fabric and VXLAN/IP fabric in which embodiments of the present disclosure may be implemented. The example shown includes two spine RBridges, RB101 and RB102, in the TRILL fabric. Similarly, two spine routers, RTR121 and RTR122, may be present in the VXLAN/IP fabric. Two leaf RBridges, RB111 and RB112, may be connected to RB101 and RB102 in the TRILL fabric. Likewise, two leaf routers, RTR113 and RTR114, belong to the VXLAN/IP fabric and may be connected to spine routers RTR121 and RTR122. Gateways GW115, GW116 and GW117 may serve as leaf RBridges/routers for both TRILL fabric and VXLAN/IP fabric. These gateways have the capability of converting frames between VXLAN and TRILL encapsulations.

Embodiments of the present disclosure can coordinate gateways for multi-destination traffic handling through TRILL IS-IS as well as layer 3 IS-IS in the underlay IP network. In some embodiments, this coordination can ensure that an IP multicast share tree is grafted with TRILL distribution trees at one and only one gateway. Otherwise, multi-destination traffic from the VXLAN/IP fabric may be, for example, either unreachable or duplicated to the TRILL fabric. In some embodiments, gateway coordination can ensure that multi-destination traffic from TRILL distribution trees is not looped back to the TRILL fabric through the VXLAN/IP fabric. In some embodiments, when the VXLAN/IP fabric is partitioned, the TRILL fabric restores connectivity among VXLAN/IP fabric partitions, and when the TRILL fabric is partitioned, the VXLAN/IP fabric restores connectivity among TRILL fabric partitions.

Figure 2:
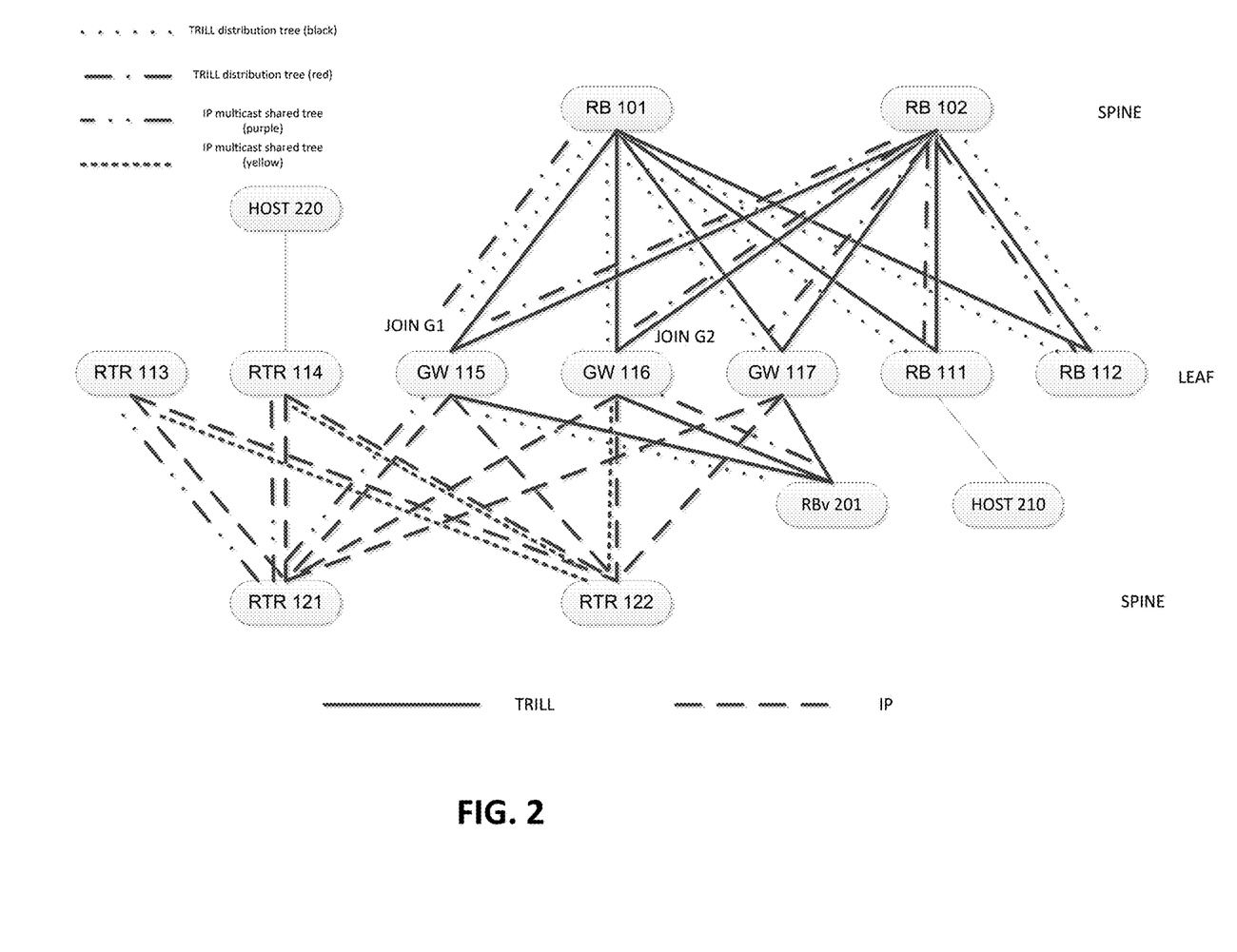
FIG. 2 depicts a scenario of coordination among three gateways in a network environment similar to that described in FIG. 1.

FIG. 2 depicts a scenario of coordination among three gateways in a network environment similar to that described in FIG. 1. There may be two distribution trees, (identified as "black" and "red" respectively), in the TRILL fabric. With regard to a common pseudo node RBv201, GW115 and GW116 may establish affinity associations with the black and red distribution trees, respectively, as described in draft-ietf-trill-cmt-01. This can guarantee that multi-destination traffic in a distribution tree is sent into the IP fabric by only one gateway.

There are also two IP multicast shared trees, (identified as "purple" and "orange" respectively), in the VXLAN/IP fabric, with rendezvous points RTR121 and RTR122, and multicast groups G1 and G2, respectively. The purple shared tree may be joined by GW115 only while the orange shared tree is joined by GW116. If both GW115 and GW116 simultaneously joined either the purple or orange shared tree, multi-destination traffic would be duplicated into the TRILL fabric. On the other hand, if the purple shared tree were joined by GW117 only, multi-destination traffic of G1 would not reach the TRILL fabric as GW117 does not have affinity association with any distribution tree.

To facilitate coordinated allocation of TRILL distribution trees and IP multicast shared trees among gateways, embodiments of the present disclosure propose a new TRILL IS-IS Distribution Tree Allocation Type Length Value ("TLV") for the TRILL fabric and a new layer 3 IS-IS Shared Tree Allocation TLV for the VXLAN/IP fabric. The new TLVs may contain the gateway's allocation priority (the lower the better), a number of trees to allocate, and a list of distribution or shared trees, identified by RBridge nicknames or group addresses, respectively. TLVs may be viewed at as blocks of information embedded in advertisements.

For example, GW115 may advertise a Distribution Tree Allocation TLV in the TRILL fabric, with allocation priority as 1, number of trees to allocate as 1, and list of distribution trees as black and red. GW115 may also advertise a Shared Tree Allocation TLV in the VXLAN/IP fabric, with allocation priority as 1, number of trees to allocate as 1, and the list of shared tree as G1 and G2. Similarly, GW116 and GW117 may advertise Distribution Tree Allocation and Shared Tree Allocation TLVs with the same values except the allocation priority, which may be 2 and 3, respectively. Based on allocation priorities, GW115 and GW116 will join multicast shared trees G1 and G2, respectively, and have affinity associations with the black and red distribution trees, respectively. GW117 will join no multicast shared tree and have affinity association with no distribution tree.

To facilitate the use of common pseudo node RBv201, embodiments of the present disclosure propose a new TRILL IS-IS Virtual RBridge Nickname TLV for the TRILL fabric, which contains a gateway's proposed virtual RBridge nickname and its priority of being selected. For example, GW115, GW116 and GW117 may each advertise TRILL IS-IS Virtual RBridge Nickname TLVs to propose different nicknames for the pseudo node RBv201, with priorities of 1, 2 and 3, respectively. Then the nickname proposed by GW115 will be selected by pseudo node RBv201 based on its priority and used by all gateways for affinity association and TRILL encapsulation.

Even if IP multicast shared trees and TRILL distribution trees are properly grafted, a loopback problem may still exist. For example, in FIG. 2, leaf RB112 may send a multi-destination frame belonging to group G1 on the red distribution tree. The frame may be sent into the VXLAN/IP fabric by GW116, which has affinity association with the red distribution tree, with G1 as destination IP address. GW115 may receive the frame, as it joins group G1, and send the frame back into the TRILL fabric on the black distribution tree, with which it has affinity association. Finally, the frame may be looped back to RB112.

A solution to the loopback problem may involve employing a split horizon. In the classic split horizon, a node will not transmit the packet back to the neighbor from which it received the announcement. If all gateways use the same VTEP address for VXLAN encapsulation, as proposed by in pending U.S. patent application Ser. No. 13/853,128, filed Mar. 29, 2013, titled "Using a Virtual Internet Protocol Address to Represent Dually Connected Hosts in an Internet Protocol Overlay Network" and incorporated herein in its entirety, GW115 may detect that the frame is encapsulated by one of the gateways through the frame's source IP address and then drop it, instead of sending it out on the black distribution tree. In the case of a multi-destination frame sourced in the VXLAN/IP fabric, in this example, the frame is not looped back into the VXLAN/IP fabric through the TRILL fabric because no TRILL distribution tree may have affinity with more than one gateway.

To facilitate the use of a common VTEP address, embodiments of the present disclosure propose a new layer 3 IS-IS Virtual VTEP Address TLV for the VXLAN/IP fabric, which contains a gateway's proposed virtual VTEP address and priority of being selected. For example, GW115, GW116 and GW117 may advertise Virtual VTEP Address TLVs with VTEP addresses indicated as va1, va2 and va3, respectively, and priorities as 1, 2 and 3, respectively. Then based on priority, they may agree on va1 as the common VTEP address to use for VXLAN encapsulation.

Once trees are properly grafted and looping is prevented, we show that load balancing can be achieved on the flow basis. In FIG. 2, consider an initial ping from a host210, connected with RB111, to host220, connected with RTR114. The first packet, an Address Resolution Protocol ("ARP") request, from host210 may be encapsulated with a distribution tree nickname, say "black tree", as an egress nickname. Since GW115 has an affinity association with the black distribution tree, the packet may be delivered to GW115. Then GW115 may learn host210's MAC binding with the RB111 nickname and convert the packet to VXLAN format with the virtual VTEP address as the source IP address and a group address, say G2, as the destination IP address for sending over the VXLAN/IP fabric.

GW115 may synchronize host210's MAC binding with other gateways. RTR114 may receive the packet from the multicast shared tree of G2 and learn host210's MAC binding with the virtual VTEP address. As the result of receiving the ARP request via RTR114, host220 may send back an ARP response packet, which is encapsulated by RTR114 with the virtual VTEP address as the destination IP address. Since the reachability of the virtual VTEP address is advertised by all gateways, the ARP response may reach any of them, GW117, for example. GW117 may learn host 220's MAC binding with RTR114 and convert the packet into TRILL format, with an ingress nickname "RBv201" and egress nickname "RB111", for sending over the TRILL fabric.

Furthermore, GW117 may synchronize host220's MAC binding with other gateways. Finally, RB111 may receive the packet and learn host220's MAC binding with RBv201. As the result of receiving the ARP response via RB111, host210 may send an Internet Control Message Protocol ("ICMP") echo request, with egress nickname "RBv201". Since the reachability of RBv201 is advertised by all gateways, the packet may reach any of them, GW116, for example. GW116 may then convert the packet into VXLAN format, with the virtual VTEP address as a source IP address, and send the packet to RTR114 based on a destination MAC address lookup. Once host220 receives the ICMP echo request via RTR114, host220 may send back an ICMP echo reply, via RTR114 and GW117, assuming the packet is in the same flow as the previous ARP response. Upon receiving the ICMP echo reply via RB111, host210 may send a second ICMP echo request, which should be in the same flow as the first ICMP echo request and thus forwarded via GW116 as well.

Figure 3:
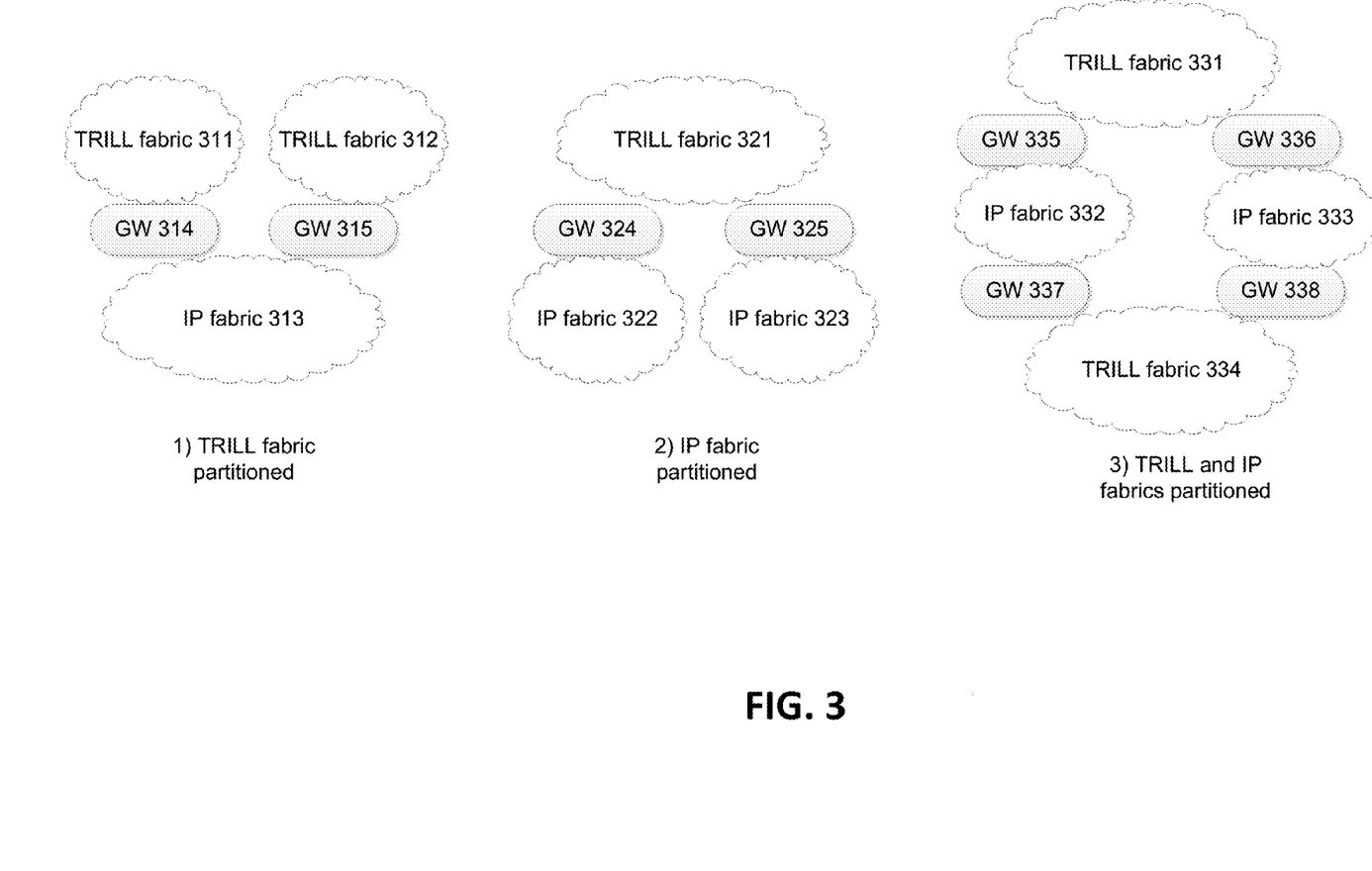
FIG. 3 illustrates depicts embodiments of three partitioning cases in the described network environment.

The above described embodiments assume that both the TRILL fabric and the VXLAN/IP fabric are connected. There are also scenarios where the TRILL fabric, the VXLAN/IP fabric, or both may be partitioned. FIG. 3 depicts embodiments of three partitioning cases. In the first case, the TRILL fabric may be partitioned into TRILL fabric 311 and TRILL fabric 312. VXLAN/IP fabric 313 may then be used to connect the two TRILL fabric partitions across GW314 and GW315.

Similarly, in the second case, VXLAN/IP fabric is partitioned into VXLAN/IP fabric 322 and VXLAN/IP fabric 323. TRILL fabric 321 may then be used to connect the two VXLAN/IP fabric partitions across GW 324 and GW 325.

In the third case, both the TRILL fabric may be partitioned into TRILL fabric 331 and TRILL fabric 334 and the VXLAN/IP fabric is partitioned into VXLAN/IP fabric 332 and VXLAN/IP fabric 333. If each TRILL fabric partition is used to connect VXLAN/IP fabric partitions and vice versa, a loop may form among TRILL fabric and VXLAN/IP fabric partitions. In this case, partition repair can be avoided.

Embodiments of the present disclosure provide solutions for determining whether a partitioning should be repaired and determining how to connect partitions in a repairable case. To facilitate the partitioning case differentiation, embodiments of the present disclosure propose a new TRILL IS-IS Gateway List TLV for the TRILL fabric, which may be used by a gateway to advertise the gateways it observes in the VXLAN/IP fabric into the TRILL fabric. A new layer 3 IS-IS Gateway List TLV for the VXLAN/IP fabric is described below, which may be used by a gateway to advertise the gateways it observes in the TRILL fabric into the VXLAN/IP fabric.

With the information provided by the new disclosed TLVs, the following two steps may be taken to identify repairable partition cases. The first step may involve determining whether the two following conditions are satisfied. The first condition may require that the union of gateways advertised in the layer 3 IS-IS Gateway List TLVs is equal to or a subset of gateways observed in the VXLAN/IP fabric. This first condition is to make sure gateways in TRILL fabric partitions cannot connect to another VXLAN/IP fabric partition. The second condition may require that the gateways advertised in the layer 3 IS-IS Gateway List TLV by a gateway is a proper subset of the union of gateways. The second condition is to check if the TRILL fabric is partitioned. If these two conditions are met, embodiments may proceed to repair TRILL fabric partitions through the VXLAN/IP fabric.

The second step to identify repairable partition cases may involve whether the following two conditions are satisfied. The first condition may require that the union of gateways advertised in the TRILL IS-IS Gateway List TLVs is equal to or a subset of gateways observed in the TRILL fabric. This first condition is to make sure gateways in VXLAN/IP fabric partitions cannot connect to another TRILL fabric partition. The second condition may require that the gateways advertised in TRILL the IS-IS Gateway List TLV by a gateway is a proper subset of the union of gateways. This second condition is to check if the VXLAN/IP fabric is partitioned. If these two conditions are met, embodiments may proceed to repair VXLAN/IP fabric partitions through the TRILL fabric.

Figure 4:
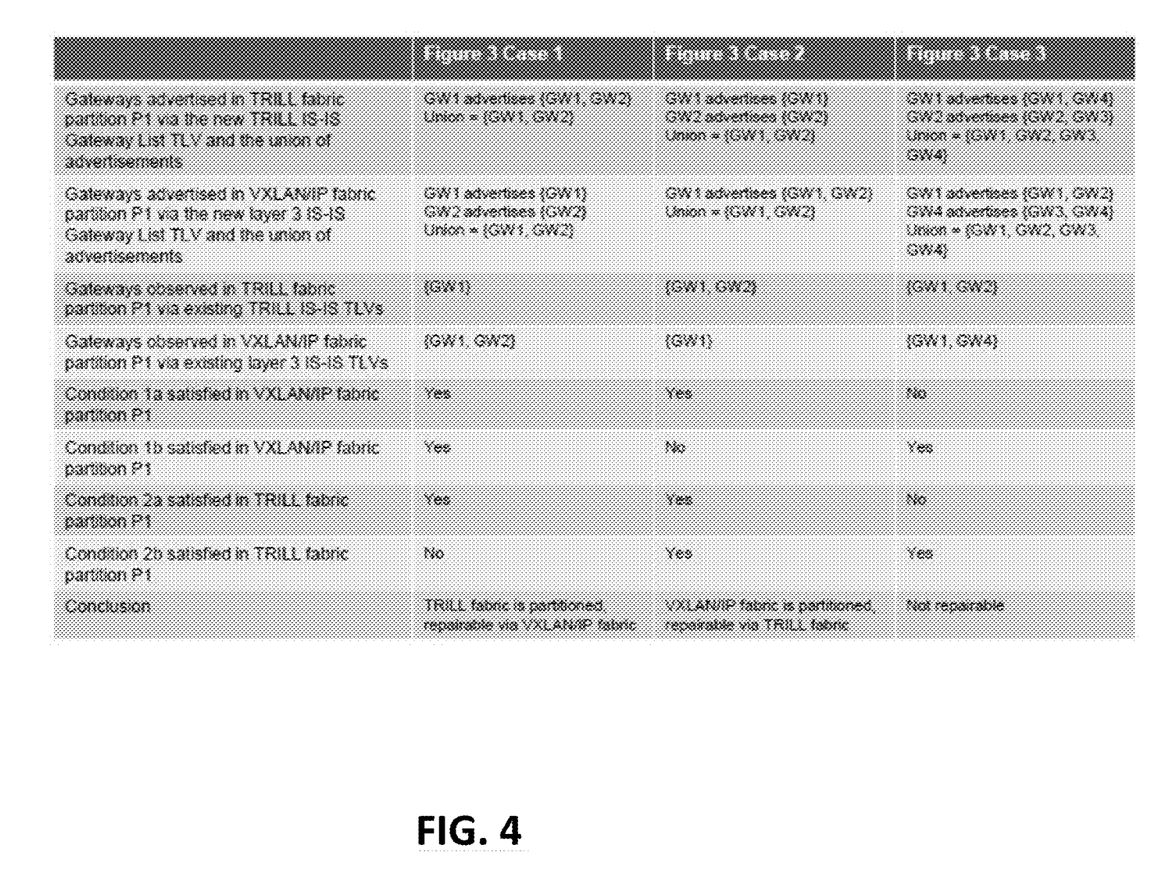
FIG. 4 illustrates application of certain conditions to the three cases depicted in FIG. 3.

FIG. 4 illustrates application of the above conditions to the three cases depicted in FIG. 3. It can be seen that based on the conditions, case 1 is properly identified as TRILL fabric partitioning repairable via VXLAN/IP fabric while case 2 is identified as VXLAN/IP fabric partitioning repairable via TRILL fabric. Case 3 is detected as not repairable.

Figure 5:
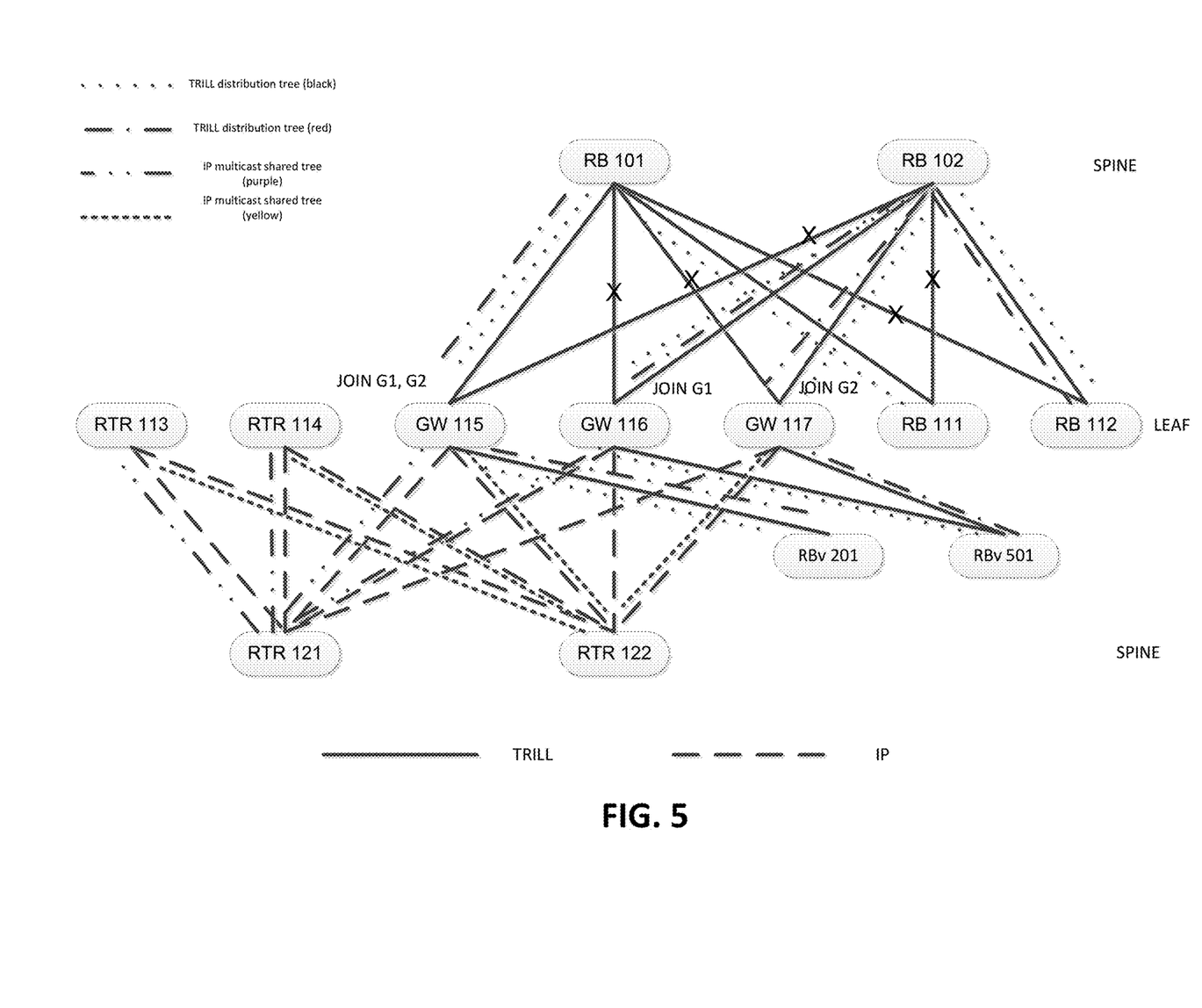
FIG. 5 illustrates embodiments of the present disclosure where the TRILL fabric is partitioned into two.

Once TRILL fabric partitioning is identified as repairable, the TRILL fabric can be repaired by using different VTEP addresses. FIG. 5 depicts such a scenario, where the TRILL fabric is partitioned into two. One partition may include of GW115, RB101, and RB111 while the other partition may include of GW116, GW117, RB102 and RB112. In this case, GW116 and GW117 still may need to use the same VTEP address to prevent looping but GW115 should use a different VTEP address so that multi-destination traffic from one TRILL fabric partition can be passed into another TRILL fabric partition.

Embodiments of the present disclosure propose a new TRILL IS-IS Virtual VTEP Address TLV for the TRILL fabric to determine the VTEP address in the case of partitioning. Different from the previously proposed layer 3 IS-IS Virtual VTEP Address TLV, the new TRILL IS-IS Virtual VTEP Address TLV may be advertised in the TRILL fabric and thus can employ different VTEP addresses for different TRILL fabric partitions.

For example, in FIG. 5, if GW115, GW116 and GW117 advertise VTEP addresses va1, va2, va3 and priority 1, 2, 3, respectively, through TRILL IS-IS Virtual VTEP Address TLVs, the partition including GW115 may use VTEP address va1 while the partition including GW116 and GW117 may use VTEP address va2.

In addition, the multicast shared tree allocation should take the partitioning into consideration. For each TRILL fabric partition, identified by the VTEP address, e.g., va1 or va2, the whole set of shared trees should be divided among the gateways belonging to the partition. For example, in FIG. 5, multicast shared trees G1 and G2 are joined by GW 115 in one partition while they are joined again by GW116 and GW117, respectively, in another partition. In this way, multi-destination traffic can flow between TRILL fabric partitions through the VXLAN/IP fabric.

Figure 6:
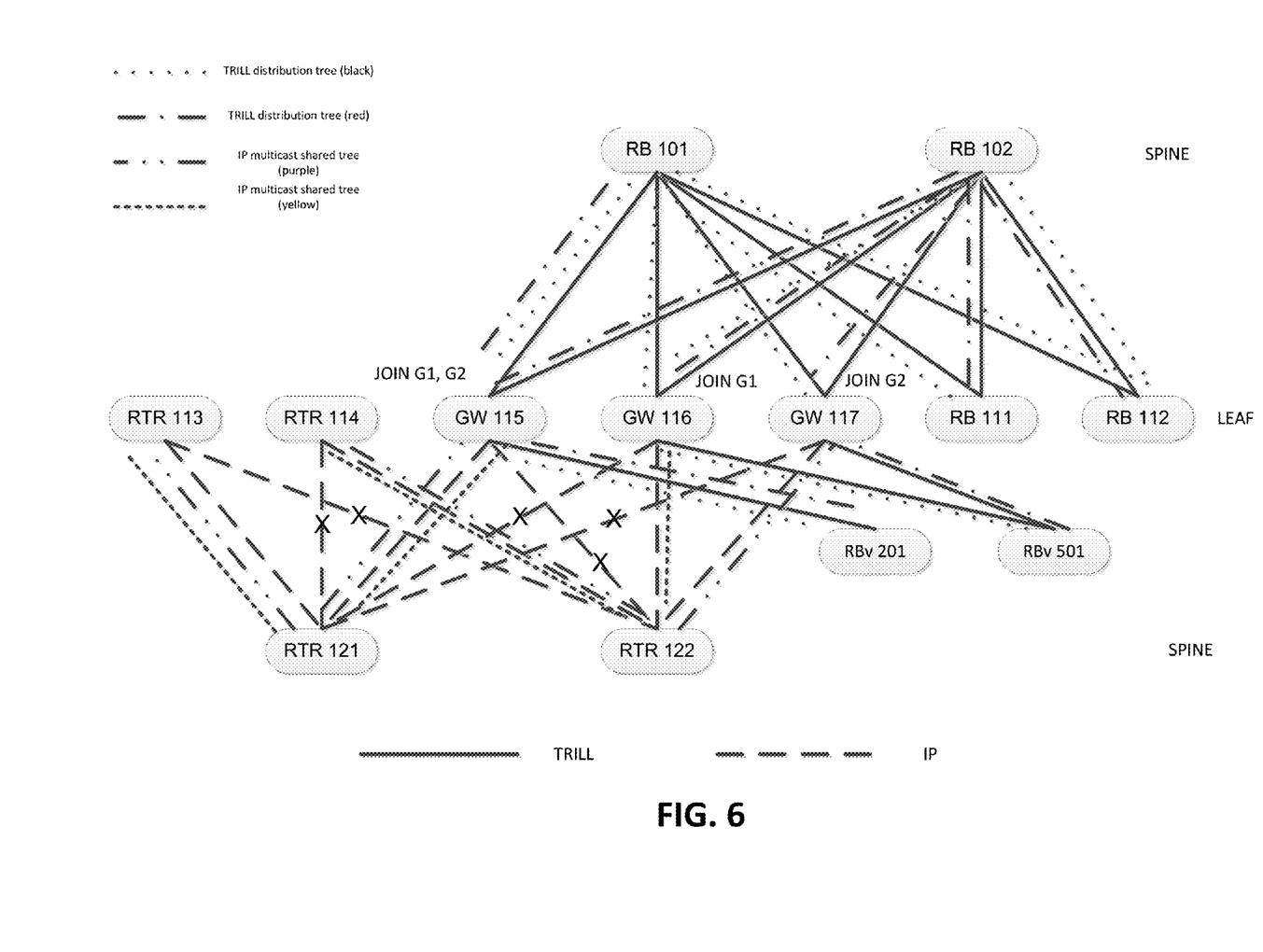
FIG. 6 illustrates embodiments of the present disclosure where the VXLAN/IP fabric is partitioned into two.

Upon a VXLAN/IP fabric partitioning being identified as repairable, the VXLAN/IP fabric may be repaired by using different pseudo node nicknames. FIG. 6 depicts such a scenario, where the VXLAN/IP fabric is partitioned into two. One partition consists of GW115, RTR121, and RTR113 while the other partition may consist of GW116, GW117, RTR122 and RTR114. In this case, GW116 and GW117 may still need to use the same pseudo node nickname for disjoint affinity associations with distribution trees as they belong to the same VXLAN/IP fabric partition. However, GW115 may use a different pseudo node nickname so that it can have affinity associations with all distribution trees, as it belongs to a different VXLAN/IP fabric partition.

Embodiments of the present disclosure propose a new layer 3 IS-IS Virtual RBridge Nickname TLV for the VXLAN/IP fabric to determine the pseudo node nickname in the case of partitioning. Different from the previously proposed TRILL IS-IS Virtual RBridge Nickname TLV, the new layer 3 IS-IS Virtual RBridge Nickname TLV may be advertised in the VXLAN/IP fabric and thus can employ different virtual nicknames for different VXLAN/IP fabric partitions.

For example, in FIG. 6, suppose GW115, GW116 and GW117 advertise virtual nicknames RBv1, RBv2, RBv3 and priorities 1, 2, 3, respectively, through layer 3 IS-IS Virtual RBridge Nickname TLVs. Then the partition including GW115 may use virtual nickname RBv1 while the partition including GW116 and GW117 may use virtual nickname RBv2. In addition, the distribution tree allocation should take the partitioning into consideration. For each VXLAN/IP fabric partition, identified by virtual nickname, e.g., RBv1 or RBv2, the whole set of distribution trees should be divided among the gateways belonging to the partition. For example, in FIG. 6, black and red distribution trees may have affinity associations with GW115 in one partition while they have affinity associations again with GW116 and GW117, respectively, in another partition. In this way, multi-destination traffic can flow between VXLAN/IP fabric partitions through the TRILL fabric.

Figure 7:
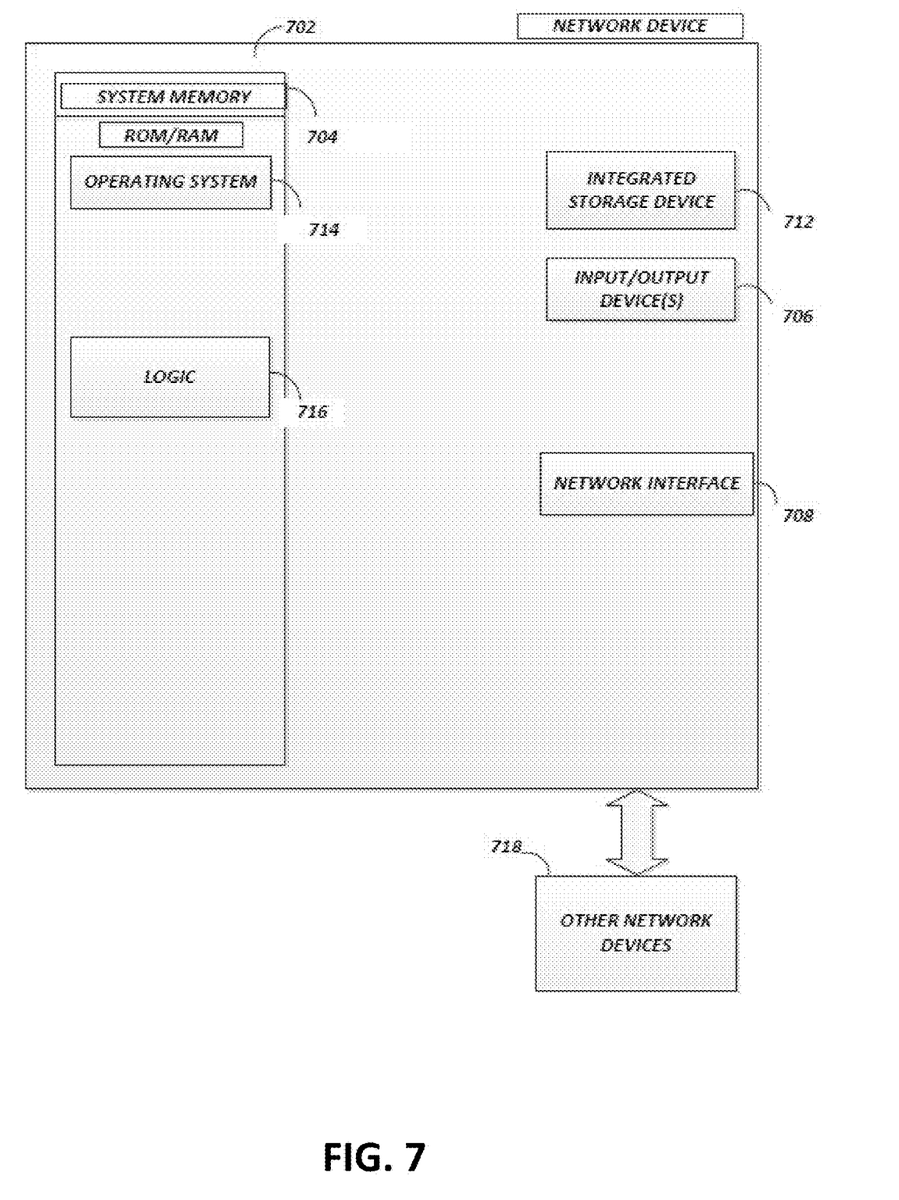
FIG. 7 shows a network device in greater detail.

FIG. 7 shows a network device (such as the above-described gateways, RBridges, routers) in greater detail. A network device may include a processing device 702, a memory 704, input/output (I/O) devices 706, and a network interface 708, each of which is communicatively coupled via a local interface (not shown). Processing device 702 may be a hardware device for executing software, particularly that which is stored in memory 704. Processing device 702 may be any custom made or commercially available processor, a central processing unit (CPU), an auxiliary processor among several processors, a semiconductor-based microprocessor (in the form of a microchip or chip set), a microprocessor, or generally any device for executing software instructions.

Network interface 708 may include one or more devices that communicate both inputs and outputs, for instance but not limited to, a modulator/demodulator (modem for accessing another device, system, or network), a radio frequency (RF) transceiver or other type of transceiver, a telephonic interface, a bridge, a router, etc.

I/O devices 706 may include input devices, for example but not limited to, a keyboard, mouse, scanner, microphone, etc. Furthermore, the I/O devices 706 may also include output devices, for example but not limited to, a printer, display, etc.

The local interface may be, for example but not limited to, one or more buses or other wired or wireless connections. The local interface may have additional elements, which are omitted for simplicity, such as controllers, buffers (caches), drivers, repeaters, and receivers, to enable communications. Further, local interface 710 may include address, control, and/or data connections to enable appropriate communications among the aforementioned components and provides the interface to communicate with a network controller (not shown) or a TOD (such as RTR 114, for example).

In some embodiments, a network device may further be configured with an integrated storage device 712 coupled to local interface 710. Storage device 712 may be configured to buffer a plurality of data packets. In some embodiments, storage device 712 may be externally coupled to a content server (not shown).

Memory 704 may include a suitable operating system (O/S) 714. Operating system 714 essentially may control the execution of other computer programs, such as scheduling, input-output control, file and data management, memory management, and communication control and related services. Logic 716 may include executable code to send service requests to the network controller or TOD.

Memory 704 may include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 704 may incorporate electronic, magnetic, optical, semi-conductive, and/or other types of storage media. Note that memory 704 may have a distributed architecture, where various components are situated remotely from one another, which can be accessed by the processing device 702.

The software in memory 704 may include one or more separate programs, each of which comprises an ordered listing of executable instructions for implementing logical functions. In the embodiment shown in FIG. 7, the software in memory 704 may include operating system 714 and logic 716, as explained above. Functionality of logic 716 may be implemented using a single module, or distributed among a plurality of modules.

When logic 716 is in operation, processing device 702 may be configured to execute logic 716 stored within memory 704, to communicate data to and from memory 704, and to generally control operations of logic 716. Logic 716 and O/S 714, in whole or in part, but typically the latter, are read by processing device 702, perhaps buffered within processing device 702, and then executed.

The network controller may include a communication interface suitable for enabling communication (e.g., TCP/IP) of data packets with other network devices 718 of a network environment. For instance, communication interface may be of a type suitable for communication over an IP network, a coaxial cable network, an HFC network, and/or wireless network, among others.

Figure 8:
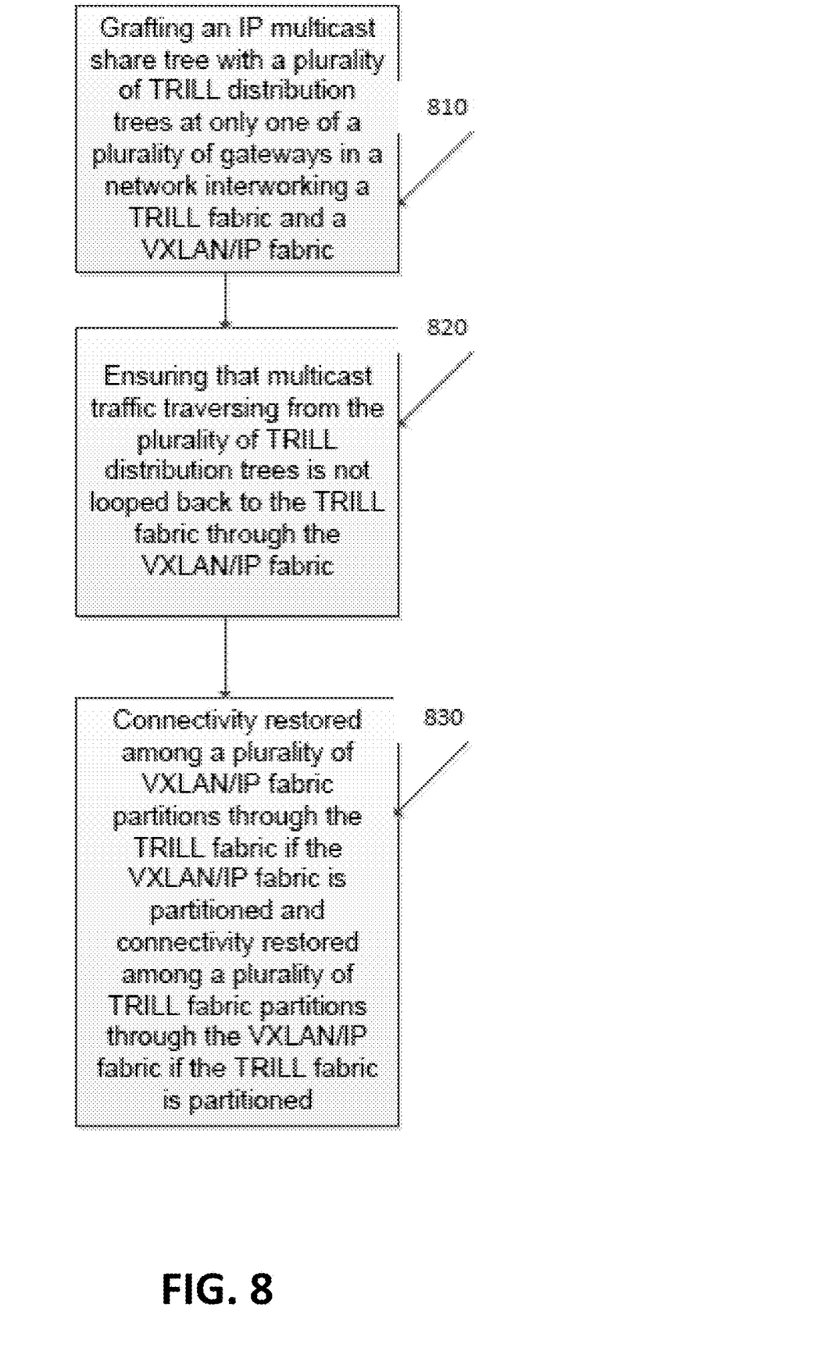
FIG. 8 is a flow chart illustrating embodiments of the present disclosure

Having described various components of certain embodiments of a network environment, a method 800 implemented by one or more network devices employed on the network environment will now be described with reference to FIG. 8. Method 800 may begin at step 810 where an IP multicast share tree may be grafted with a plurality of TRILL distribution trees at only one of a plurality of gateways in a network interworking a TRILL fabric and a VXLAN/IP fabric. Affinity associations may be established between a single gateway and only one of the plurality of TRILL distribution trees in regards to a first pseudo node.

To accomplish step 810 a first TRILL TLV (such as TRILL IS-IS Distribution Tree Allocation TLV) may be advertised to the TRILL fabric, wherein the first TRILL TLV comprises at least a gateway allocation priority, a number of trees to allocate, and a list of TRILL distribution trees identified by RBridge nicknames. A gateway may join a first group of multicast shared trees based on the first Layer 3 TLV. An affinity association may be created between a gateway and one or more TRILL distribution trees based on the first TRILL TLV. In some embodiments, no TRILL distribution tree has an affinity association with more than one gateway.

Furthermore, a first Layer 3 TLV (such as Layer 3 IS-IS Shared Tree Allocation TLV) may be advertised to the VXLAN/IP fabric, wherein the first Layer 3 TLV comprises at least a gateway allocation priority, a number of trees to allocate, and a list of Layer 3 shared trees identified by group addresses. In some embodiments of the present disclosure, each of the plurality of gateways may have a different gateway priority. Furthermore, the priority values may be ordered such that a lower number indicates a higher gateway priority value.

To facilitate the use of a common pseudo node a second TRILL TLV (such as TRILL IS-IS Virtual RBridge Nickname TLV) may be advertised to the TRILL fabric, wherein the second TRILL TLV comprises at least a proposed gateway virtual RBridge nickname and a priority for selection by the pseudo node associated with each gateway.

Method 800 may then proceed to step 820 where it may be ensured that multicast traffic traversing from the plurality of TRILL distribution trees is not looped back to the TRILL fabric through the VXLAN/IP fabric. To prevent looping, a split horizon may be created. Operation of the split horizon may start with detecting at a first gateway that a frame is encapsulated by one of a plurality of other gateways based on a source IP address associated with the frame. If that is the case the packet may then be dropped.

In some embodiments, the split horizon may be based on a common VXLAN tunnel end point ("VTEP") address. The common VTEP address may be selected based on a second Layer 3 TLV (such as Layer 3 IS-IS Virtual VTEP Address TLV), wherein the second Layer 3 TLV comprises at least information regarding a plurality of proposed virtual VTEP addresses and respective priorities for the proposed virtual VTEP addresses.

Method 800 may then proceed to step 830 where connectivity may be restored among a plurality of VXLAN/IP fabric partitions through the TRILL fabric if the VXLAN/IP fabric is partitioned and connectivity may be restored among a plurality of TRILL fabric partitions through the VXLAN/IP fabric if the TRILL fabric is partitioned. In some embodiments, the step of restoring connectivity among a plurality of VXLAN/IP fabric partitions may further comprise advertising a third TRILL TLV (such as TRILL IS-IS Gateway List TLV to advertise gateways observed in the VXLAN/IP fabric to the TRILL fabric. Similarly, the step of restoring connectivity among a plurality of TRILL fabric partitions may further comprise advertising a third Layer 3 TLV (such as Layer 3 IS-IS Gateway List TLV to advertise gateways observed in the TRILL fabric to the VXLAN/IP fabric.

In step 830, TRILL partitions may only be repaired if: a) a union of gateways advertised in the third Layer 3 TLV is equal to or a subset of the gateways observed in the VXLAN/IP fabric and b) the gateways advertised on the third Layer 3 TLV by a first gateway is a proper subset of the advertised union of gateways. Similarly, the VXLAN/IP partitions may only be repaired if: a) a union of gateways advertised in the third TRILL TLV is equal to or a subset of the gateways observed in the TRILL fabric and b) the gateways advertised on the third TRILL TLV by a first gateway is a proper subset of the advertised union of gateways.

The repairing function may be implemented by repairing the TRILL partitions using a fourth TRILL TLV (such as TRILL IS-IS Virtual VTEP Address TLV), wherein the fourth TRILL TLV comprises at least information regarding a plurality of proposed virtual VTEP addresses to be applied to each TRILL partition. Similarly, repairing the VXLAN/IP partitions may be implemented using the fourth Layer 3 TLV (such as Layer 3 IS-IS Virtual RBridge Nickname TLV), wherein the fourth Layer 3 TLV comprises at least information regarding a plurality of proposed virtual RBridge nicknames to be applied to each VXLAN/IP partition.

Embodiments of the disclosure, for example, may be implemented as a computer process (method), a computing system, or as an article of manufacture, such as a non-transitory computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    grafting an Internet Protocol (IP) multicast share tree with a plurality of Transparent Interconnect of Lots of Links (TRILL) distribution trees at only one of a plurality of gateways in a network interworking a TRILL fabric and a Virtual extensible Local Area Network/ Internet Protocol VXLAN/IP fabric;
    ensuring that multicast traffic traversing from the plurality of TRILL distribution trees is not looped back to the TRILL fabric through the VXLAN/IP fabric;
    restoring connectivity among a plurality of VXLAN/IP fabric partitions through the TRILL fabric if the VXLAN/IP fabric is partitioned;
    restoring connectivity among a plurality of TRILL fabric partitions through the VXLAN/IP fabric if the TRILL fabric is partitioned;
    establishing affinity associations between a single gateway and only one of the plurality of TRILL distribution trees in regards to a first pseudo node:
    advertising a first TRILL Type Length Value (TLV) to the TRILL fabric, wherein the first TRILL TLV comprises at least a gateway allocation priority, a number of trees to allocate, and a list of TRILL distribution trees identified by RBridge nicknames; and
    advertising a first Layer 3 TLV to the VXLAN/IP fabric, wherein the first Layer 3 TLV comprises at least a gateway allocation priority, a number of trees to allocate, and a list of Layer 3 shared trees identified by group addresses.

2. The method of claim 1, wherein each of the plurality of gateways has a different gateway priority.

3. The method of claim 2, further comprising:
    joining a gateway to a first group of multicast shared trees based on the first Layer 3 TLV.

4. The method of claim 3, further comprising:
    creating an affinity association between a gateway and one or more TRILL distribution trees based on the first TRILL TLV.

5. The method of claim 4, wherein no TRILL distribution tree has an affinity association with more than one gateway.

6. The method of claim 1, further comprising: advertising a second TRILL TLV to the TRILL fabric, wherein the second TRILL TLV comprises at least a proposed gateway virtual RBridge nickname and a priority for selection by the pseudo node associated with each gateway.

7. The method of claim 6, further comprising: creating a split horizon, wherein operation of the split horizon comprises:
    detecting at a first gateway that a frame is encapsulated by one of a plurality of other gateways based on a source IP address associated with the frame; and
    dropping the packet.

8. The method of claim 7, further comprising basing the split horizon on a common VXLAN tunnel end point ("VTEP") address.

9. The method of claim 8, further comprising selecting the common VTEP address based on a second Layer 3 TLV, wherein the second Layer 3 TLV comprises at least information regarding a plurality of proposed virtual VTEP addresses and respective priorities for the proposed virtual VTEP addresses.

10. The method of claim 1, wherein the step of restoring connectivity among a plurality of VXLAN/IP fabric partitions further comprises: advertising a third TRILL TLV to advertise gateways observed in the VXLAN/IP fabric to the TRILL fabric.

11. The method of claim 10, further comprising: only repairing the VXLAN/IP partitions if: a) a union of gateways advertised in the third TRILL TLV is equal to or a subset of the gateways observed in the TRILL fabric and b) the gateways advertised on the third TRILL TLV by a first gateway is a proper subset of the advertised union of gateways.

12. The method of claim 11, further comprising: repairing the VXLAN/IP partitions using the fourth Layer 3 TLV, wherein the fourth Layer 3 TLV comprises at least information regarding a plurality of proposed virtual RBridge nicknames to be applied to each VXLAN/IP partition.

13. The method of claim 1, wherein the step of restoring connectivity among a plurality of TRILL fabric partitions further comprises: advertising a third Layer 3 TLV to advertise gateways observed in the TRILL fabric to the VXLAN/IP fabric.

14. The method of claim 13, further comprising: only repairing the TRILL partitions if: a) a union of gateways advertised in the third Layer 3 TLV is equal to or a subset of the gateways observed in the VXLAN/IP fabric and b) the gateways advertised on the third Layer 3 TLV by a first gateway is a proper subset of the advertised union of gateways.

15. The method of claim 14, further comprising: repairing the TRILL partitions using a fourth TRILL TLV, wherein the fourth TRILL TLV comprises at least information regarding a plurality of proposed virtual VTEP addresses to be applied to each TRILL partition.

16. A method comprising:
grafting an Internet Protocol (IP) multicast share tree with a plurality of Transparent Interconnected Lots of Links (TRILL) distribution trees at only one of a plurality of gateways in a network interworking a TRILL fabric and a Virtual Extensive Local Area Network / Internet Protocol (VXLAN/IP) fabric;
ensuring that multicast traffic traversing from the plurality of TRILL distribution trees is not looped back to the TRILL fabric through the VXLAN/IP fabric;
restoring connectivity among a plurality of VXLAN/IP fabric partitions through the TRILL fabric if the VXLAN/IP fabric is partitioned;
restoring connectivity among a plurality of TRILL fabric partitions through the VXLAN/IP fabric if the TRILL fabric is partitioned wherein restoring connectivity among the plurality of TRILL fabric partitions comprises advertising a Layer 3 Type Length Value (TLV) to advertise gateways observed in the TRILL fabric to the VXLAN/IP fabric; and
only repairing the TRILL partitions when: a) a union of gateways advertised in the Layer 3 TLV is equal to or a subset of the gateways observed in the VXLAN/IP fabric; and b) the gateways advertised on the Layer 3 TLV by a first gateway is a proper subset of the advertised union of gateways.

17. The method of claim 16, further comprising establishing affinity associations between a single gateway and only one of the plurality of TRILL distribution trees in regards to a first pseudo node.

18. The method of claim 17, further comprising:
advertising a first TRILL TLV to the TRILL fabric, wherein the first TRILL TLV comprises at least a gateway allocation priority, a number of trees to allocate, and a list of TRILL distribution trees identified by RBridge nicknames; and
advertising a first Layer 3 TLV to the VXLAN/IP fabric, wherein the first Layer 3 TLV comprises at least a gateway allocation priority, a number of trees to allocate, and a list of Layer 3 shared trees identified by group addresses.

19. A method comprising:
grafting an Internet Protocol IP) multicast share tree with a plurality of Transparent Interconnected Lots of Links (TRILL) distribution trees at only one of a plurality of gateways in a network interworking a TRILL fabric and a Virtual Extensive Local Area Network / Internet Protocol VXLAN/IP) fabric;
ensuring that multicast traffic traversing from the plurality of TRILL distribution trees is not looped back to the TRILL fabric through the VXLAN/IP fabric;
restoring connectivity among a plurality of VXLAN/IP fabric partitions through the TRILL fabric if the VXLAN/IP fabric is partitioned, wherein restoring connectivity among the plurality of VXLAN/IP fabric partitions further comprises advertising a TRILL Type Length Value (TLV) to advertise gateways observed in the VXLAN/IP fabric to the TRILL fabric;
restoring connectivity among a plurality of TRILL fabric partitions through the VXLAN/IP fabric if the TRILL fabric is partitioned; and
only repairing the VXLAN/IP partitions when: a) a union of gateways advertised in the TRILL TLV is equal to or a subset of the gateways observed in the TRILL fabric; and b) the gateways advertised on the TRILL TLV by a first gateway is a proper subset of the advertised union of gateways.

20. The method of claim 19, further comprising establishing affinity associations between a single gateway and only one of the plurality of TRILL distribution trees in regards to a first pseudo node.

* * * * *